US011469426B2

(12) United States Patent
Lee et al.

(10) Patent No.: US 11,469,426 B2
(45) Date of Patent: Oct. 11, 2022

(54) THERMAL MANAGEMENT SYSTEM FOR FUEL CELL VEHICLE (71) Applicants: Hyundai Motor Company, Seoul (KR); Kia Motors Corporation, Seoul (KR)

(72) Inventors: Jin Hun Lee, Yongin-si (KR); Tae Geun Kim, Seoul (KR); Hyun Ju Ji, Seoul (KR); Wook Il Jang, Yongin-si (KR); Oh Tak Kwon, Yongin-si (KR); Hun Woo Park, Namyangju-si (KR); Chui Wan Park, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 247 days.

(21) Appl. No.: 16/866,938

(22) Filed: May 5, 2020

(65) Prior Publication Data
US 2021/0159520 A1 May 27, 2021

(30) Foreign Application Priority Data

Nov. 21, 2019 (KR) .......................... 10-2019-0150658

(51) Int. Cl.
*H01M 8/04007* (2016.01)
*H01M 8/04701* (2016.01)
*H01M 8/04029* (2016.01)
*B60L 1/06* (2006.01)
*B60L 50/71* (2019.01)

(52) U.S. Cl.
CPC .......... *H01M 8/04074* (2013.01); *B60L 1/06* (2013.01); *B60L 50/71* (2019.02); *H01M 8/04029* (2013.01); *H01M 8/04037* (2013.01); *H01M 8/04701* (2013.01); *H01M 2250/20* (2013.01)

(58) Field of Classification Search
CPC .. B60L 1/06; B60L 50/71; B60L 58/32; B60L 58/33; B60L 58/34; H01M 10/0562; H01M 2250/20; H01M 2300/0068; H01M 8/04029; H01M 8/04037; H01M 8/04074; H01M 8/04701; Y02E 60/10; Y02E 60/50; Y02T 10/70; Y02T 90/40
See application file for complete search history.

(56) References Cited

U.S. PATENT DOCUMENTS 7,451,808 B2 * 11/2008 Busse ...................... F01P 3/20
62/238.7
2019/0181476 A1 6/2019 Jeong

FOREIGN PATENT DOCUMENTS

KR 20190067629 A 6/2019

* cited by examiner

*Primary Examiner* — Victoria H Lynch
(74) *Attorney, Agent, or Firm* — Slater Matsil, LLP (57) ABSTRACT

A thermal management system for a fuel cell vehicle is provided. The thermal management system includes a fuel cell stack, a heater configured to use power generated by the fuel cell stack, a radiator configured to cool a coolant, a pump configured to circulate the coolant, and a valve configured to control a temperature of the coolant by adjusting a flow rate of the coolant supplied to the pump from at least one of the fuel cell stack, the heater, or the radiator.

17 Claims, 8 Drawing Sheets

FIG. 8 ated heat or assists the preheating of the power generator when a vehicle starts up. The thermal management system uses two valves, i.e., a three-way valve and a four-way valve, to control the temperature (normal operation), preheat the generator at cold start, consume the residual oxygen at shutdown (or consume the internal power of a stack in the event of a crash), consume regenerative braking energy consumption due to a full battery in driving downhill, and prevent an ion filter from high-temperature exposure. Since such a conventional thermal management system uses two valves, a large amount of system material costs are required.

THERMAL MANAGEMENT SYSTEM FOR FUEL CELL VEHICLE

CROSS-REFERENCE TO RELATED APPLICATIONS

This application claims priority to Korean Patent Application No. 10-2019-0150658, filed on Nov. 21, 2019, which application is hereby incorporated herein by reference.

TECHNICAL FIELD

The present disclosure relates to a thermal management system for a fuel cell vehicle.

BACKGROUND

A fuel cell vehicle refers to a vehicle using a fuel cell as a power source. A fuel cell system mounted on such a fuel cell vehicle includes a fuel cell stack, a hydrogen supply system, an air supply system, and a thermal management system. Among them, the thermal management system blocks and cools heat to maintain thermal balance within the fuel cell power generation system and recovers excessive heat or assists the preheating of the power generator when a vehicle starts up. The thermal management system uses two valves, i.e., a three-way valve and a four-way valve, to control the temperature (normal operation), preheat the generator at cold start, consume the residual oxygen at shutdown (or consume the internal power of a stack in the event of a crash), consume regenerative braking energy consumption due to a full battery in driving downhill, and prevent an ion filter from high-temperature exposure. Since such a conventional thermal management system uses two valves, a large amount of system material costs are required.

SUMMARY

The present disclosure has been made to solve the above-mentioned problems occurring in the prior art while advantages achieved by the prior art are maintained intact.

An embodiment of the present disclosure provides a thermal management system for a fuel cell vehicle capable of controlling the temperature and the flow of a coolant using one valve.

The technical problems to be solved by the present inventive concept are not limited to the aforementioned problems, and any other technical problems not mentioned herein will be clearly understood from the following description by those skilled in the art to which the present disclosure pertains.

According to an embodiment of the present invention, a thermal management system for a fuel cell vehicle includes a fuel cell stack, a heater using power generated by the fuel cell stack, a radiator to cool a coolant, a pump to circulate the coolant, and a valve to control a temperature of the coolant by adjusting a flow rate of the coolant supplied to the pump from at least one of the fuel cell stack, the heater, and/or the radiator.

The valve is disposed between the radiator and the pump.

The valve includes a five-way valve.

The thermal management system further includes a controller to control an opening degree of each entrance of the five-way valve.

The controller is mounted inside the valve.

The controller adjusts the temperature of the coolant by selectively controlling an opening degree of a first entrance of the valve connected with an outlet end of the radiator and an opening degree of a second entrance of the valve connected with an outlet end of the fuel cell stack.

The controller consumes electric energy generated through regenerative braking when a battery is fully charged by supplying the electric energy to the heater, and adjusts a flow rate of the coolant passing through the heater by adjusting an opening degree of a third entrance, which is connected with the heater, of the valve.

The controller controls flow rates of the coolant, which is supplied to the fuel cell stack and the heater, by controlling an opening degree of a second entrance, which is connected with an outlet end of the fuel cell stack, of the valve and closing an opening degree of a first entrance, which is connected with an outlet end of the radiator, of the valve, in cold start.

The controller decreases or blocks the coolant flowing into the ion filter by controlling an opening degree of a fifth entrance, which is connected with the ion filter, of the valve, when thermal energy generated from the fuel cell stack exceeds a heat radiation limit of the radiator.

The thermal management system further includes an ion filter disposed between an outlet end of the pump and the valve to remove ions from the coolant.

The thermal management system further includes a heater disposed between an outlet end of the pump and the valve to adjust an internal temperature of a vehicle using thermal energy of the coolant.

The valve is disposed between the fuel cell stack and the radiator.

The valve includes a controller to control an opening degree of each entrance of the five-way valve.

The controller adjusts the temperature of the coolant by selectively controlling an opening degree of a first entrance, which is connected with an inlet end of the pump, of the valve and an opening degree of a second entrance, which is connected with an outlet end of the radiator, of the valve.

The controller consumes electric energy generated through regenerative braking when a battery is fully charged by supplying the electric energy to the heater, and adjusts a flow rate of the coolant passing through the heater by adjusting an opening degree of a fourth entrance, which is connected with the heater, of the valve.

The controller controls flow rates of the coolant, which is supplied to the fuel cell stack and the heater, by closing an opening degree of a second entrance, which is connected with an inlet end of the radiator, of the valve and controlling an opening degree of a third entrance, which is connected with an outlet end of the fuel cell stack, of the valve, and an opening degree of a fourth entrance, which is connected with an outlet end of the heater, of the valve in cold start.

The controller decreases or blocks the coolant flowing into the ion filter by controlling an opening degree of a fifth entrance, which is connected with the ion filter, of the valve, when thermal energy generated from the fuel cell stack exceeds a heat radiation limit of the radiator.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of embodiments of the present disclosure, a detailed description of well-known features or functions will be omitted in order not to unnecessarily obscure the gist of the present disclosure In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

Figure 1:
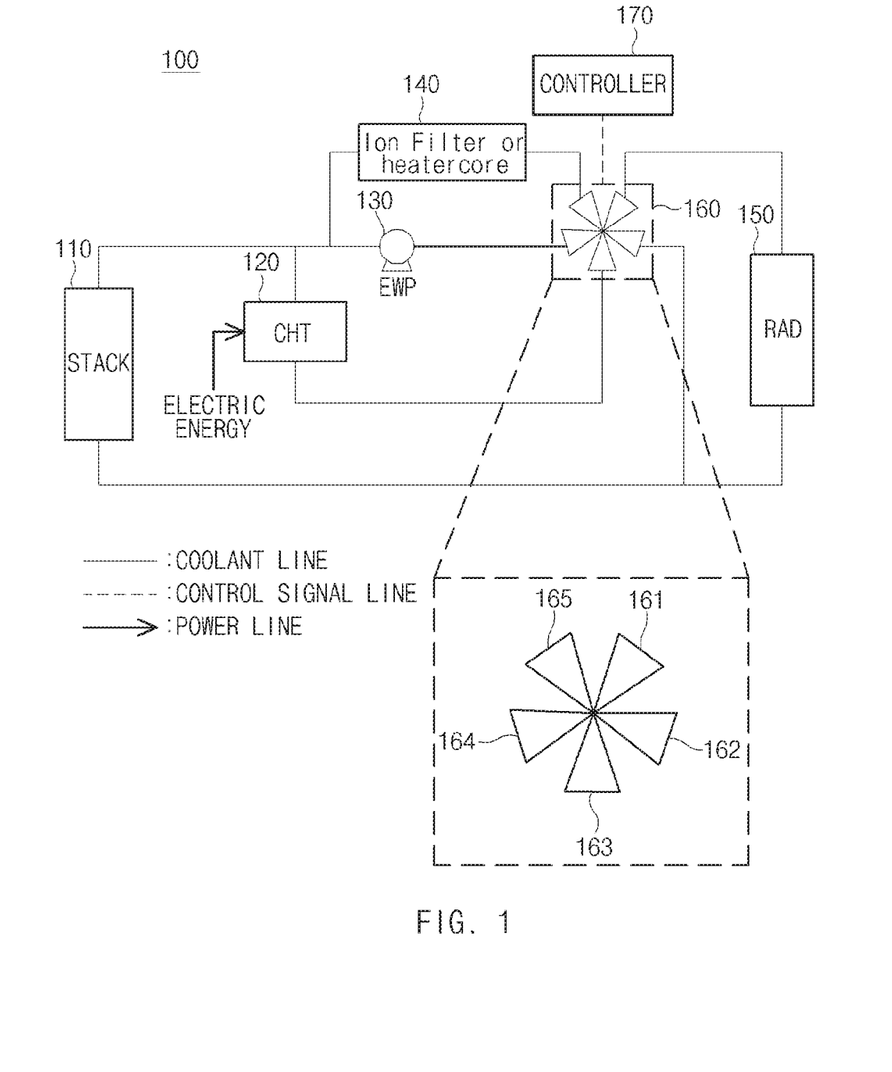
FIG. 1 is a view illustrating a thermal management system according to an embodiment of the present disclosure.

FIG. 1 is a view illustrating a thermal management system according to an embodiment of the present disclosure.

Referring to FIG. 1, a thermal management system 100, which controls the temperature of a coolant and supplies the coolant to a fuel cell stack 110, includes the fuel cell stack 110, a heater 120, a pump 130, an ion filter 140, a radiator 150, a valve 160, and a controller 170.

The fuel cell stack 110 produces electric energy by an electrochemical reaction between hydrogen and oxygen. The fuel cell stack 110 includes two catalyst electrodes, that is, an anode and a cathode. When hydrogen and oxygen are supplied to the anode and the cathode, respectively, the anode separates the hydrogen into protons, that is, hydrogen ions and electrons. The hydrogen ions move to the cathode through an electrolyte layer, in which hydrogen ions are combined with oxygen to produce water. The electrons pass through an external circuit to generate a current. In other words, the electric energy is produced due to the potential difference between the anode and the cathode. The electric energy generated from the fuel cell stack 110 may be used as driving energy of an electric motor (not illustrated) or the heater 120. The fuel cell stack 110 emits thermal energy generated during an electrochemical reaction between hydrogen and oxygen through the coolant flowing into the fuel cell stack 110.

The heater 120 increases the temperature of the coolant by heating the coolant to improve durability of the fuel cell stack 110 and improve cold start ability. The heater 120 may be implemented with a Cathode Oxygen Depletion (COD) heater (CHT).

The heater 120 prevents deterioration of the fuel cell stack 110 by removing oxygen and hydrogen remaining in the fuel cell stack 110 when the vehicle is shut down or when the vehicle is crashed. The heater 120 receives electric energy produced through regenerative braking when the battery is fully charged during driving downhill, and consumes the electric energy to heat the coolant. The heater 120 increases the temperature of the coolant by heating the coolant using electric energy produced from the fuel cell stack 110 or electric energy supplied from the battery (high voltage battery) in cold start.

The pump 130 circulates the coolant along a coolant flow path (line) by using the pressure action. The pump 130 may be implemented with an electric water pump (EWP). The pump 130 supplies the coolant to the fuel cell stack 110 and/or the heater 120. The pump 130 may supply the coolant to the ion filter 140.

The ion filter 140 is positioned between the outlet end of the pump 130 and the valve 160. The ion filter 140 removes ions from the coolant circulated by the pump 130 to maintain the electrical conductivity of the coolant to be constant. A heater core may be positioned between the output end of the pump 130 and the valve 160, instead of the ion filter 140. The heater core, which is a heater to adjust the internal temperature of the vehicle using heat of the coolant, may be implemented with a cabin heater.

The radiator (RAD) 150 cools down coolant having the temperature increased due to the thermal energy generated from the fuel cell stack 110. The radiator 150 decreases the temperature of the coolant through heat exchange between the coolant and the ambient air. The radiator 150 may include a cooling fan to supply the ambient air to the radiator 150 to cool the coolant such that heat exchange efficiency is enhanced.

The valve 160 is disposed between the pump 130 and the radiator 150 to determine the flow path depending on the temperature of the coolant. The valve 160 supplies the coolant to the pump 130 by adjusting the flow rate of the coolant flow from at least one of the outlet end of the fuel cell stack 110, the outlet end of the heater 120, the outlet end of the ion filter 140, and/or the outlet end of the radiator 150. The valve 160 may be implemented with a five-way valve, for example, an electric thermostat. In other words, the valve 160 includes a first entrance 161 connected with the outlet end of the radiator 150, a second entrance 162 connected with the outlet end of the fuel cell stack 110, a third entrance 163 connected with an outlet end of the heater 120, a fourth entrance 164 connected with an inlet end (inlet) of the pump 130, and a fifth entrance 165 connected with the outlet end of the ion filter 140.

The controller 170 controls the flow of the coolant by controlling opening or closing and/or the opening degree of the valve 160 depending on the operation mode of the thermal management system 100. The controller 170 may determine an operation mode of the thermal management system 100 based on data collected through sensors and/or an electronic control unit (ECU) mounted on a vehicle. In this case, the sensors may include temperature sensors, collision sensors, and/or gyro sensors. The ECU may include a fuel cell management device, a battery management device, a vehicle body control device, and/or a chassis control device.

Although the controller 170 is not illustrated in the drawing in detail, the controller 170 may include a communication module, a processor, and a memory. The communication module may transmit or receive data with the ECU connected with the communication module through a vehicle network, for example, a controller area network (CAN). The processor may include at least one of an Application Specific Integrated Circuit (ASIC), a Digital Signal Processor (DSP), Programmable Logic Devices (PLD), Field Programmable Gate Arrays (FPGAs), a Central Processing unit (CPU), microcontrollers, and microprocessors. The memory may store software programmed such that the processor performs a preset operation. The memory may store input data and/or output data based on the operation of the processor. The memory may be implemented with at least one of storage media (recording media) such as a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), and a register.

Although the present embodiment is described in that the controller 170 is provided separately from the valve 160, the present disclosure is not limited, and the controller 170 may be implemented to be provided inside the valve 160.

Hereinafter, the operation of the controller 170 will be described in more detail with reference to FIGS. 2 to 4.

Figure 2:
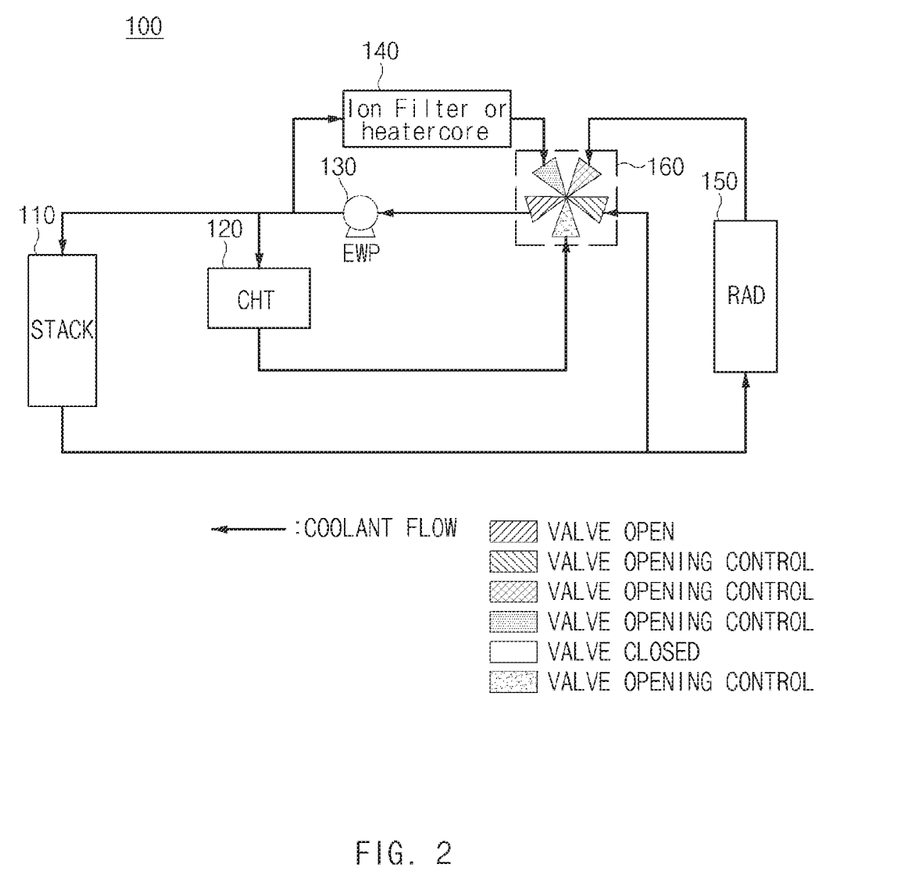
FIGS. 2 to 4 are views illustrating the flow of a coolant depending on valve control of the thermal management system according to an embodiment of the present disclosure.
Figure 3:
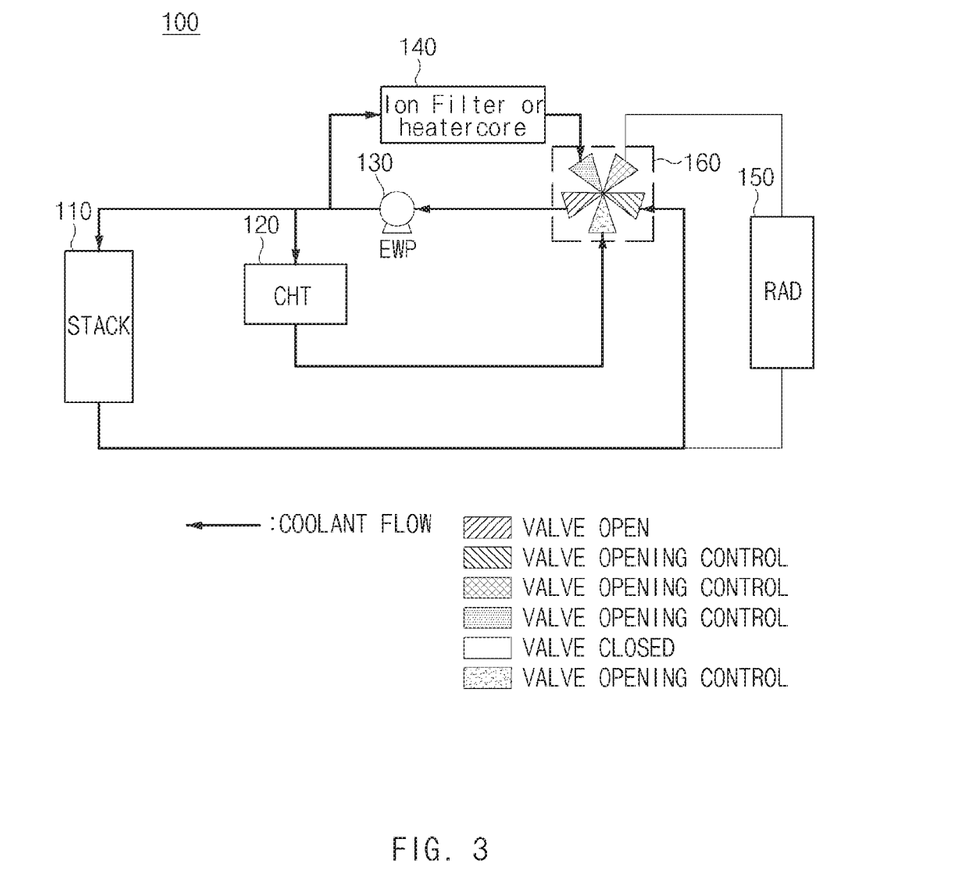
Figure 4:
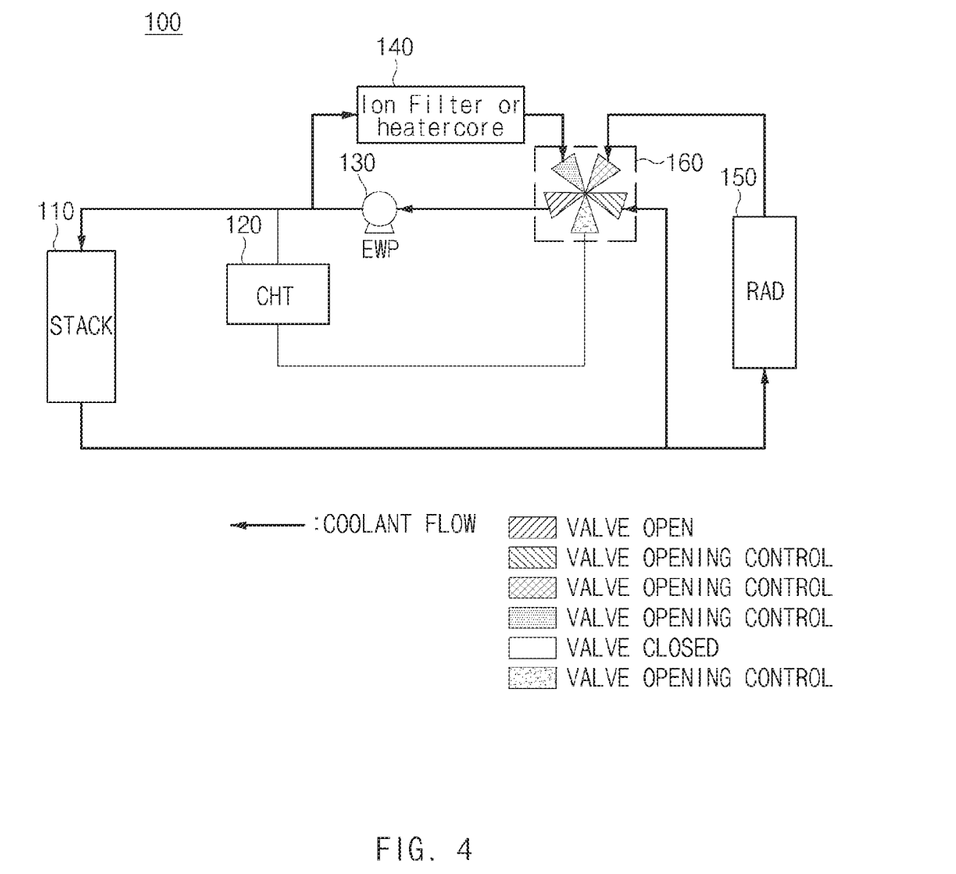

FIGS. 2 to 4 are views illustrating the flow of a coolant depending on valve control of the thermal management system according to an embodiment of the present disclosure.

First, the following description will be made with reference to FIG. 2 while focusing on the flow control of the coolant when the temperature of the coolant is controlled.

When the temperature (system temperature) of the fuel cell stack 110 is out of the operating temperature range, the controller 170 senses the temperature out of the operating temperature range through a fuel cell management device (not illustrated), and controls the opening amounts (open degrees) of the first entrance 161 and the second entrance 162 of the valve 160 to maintain the temperature of the coolant to a target temperature. In this case, the opening amount of the first entrance 161 may be set to 'x', and the opening amount of the second entrance 162 may be set to '1−x'.

When the temperature of the coolant is higher than the target temperature, the controller 170 increases the opening amount of the first entrance 161 (that is, decreases the opening amount of the second entrance 162) to increase the flow rate of the coolant supplied to the pump 130 from the radiator 150. Meanwhile, when the temperature of the coolant is lower than the target temperature, the controller 170 increases the opening amount of the second entrance 162 (decrease the opening amount of the first entrance 161) to increase the flow rate of the coolant to be bypassed from the fuel cell stack 110 and supplied to the pump 130. Accordingly, the controller 170 may maintain the temperature of the coolant to the target temperature. In this case, the temperature of the coolant refers to the temperature of the coolant supplied to the fuel cell stack 110.

The controller 170 controls the opening degree (opening amount) of the fifth entrance 165 to control the flow rate of the coolant passing through the ion filter 140.

The controller 170 may selectively control the opening degree of the third entrance 163 to adjust the flow rate of the coolant, which is heated by the heater 120, to the pump 130. For example, when cooling of the coolant is required, the controller 170 closes the third entrance 163 to block the supply of the coolant heated by the heater 120 and controls the opening degrees of the first entrance 161 and the second entrance 162 to control the temperature of the coolant. When the increase in the temperature of the coolant is required, the controller 170 supplies power to the heater 120 to heat the coolant, and controls the opening degrees of the first entrance 161, the second entrance 162, and the third entrance 163 such that the coolant is supplied to the fuel cell stack 110 and the heater 120 at the flow rate required by the thermal management system.

Second, the following description will be made with reference to FIG. 2 while focusing on the flow control of the coolant when the consumption of the internal residual energy and extra energy (excessive energy) of the fuel cell stack 110 is required.

The controller 170 operates the heater 120 to consume the internal residual energy of the fuel cell stack 110 when sensing the start off of the vehicle, that is, the vehicle shutdown or the vehicle collision. In other words, the controller 170 supplies electric energy (power) to the heater 120 to operate the heater 120 to consume oxygen and hydrogen remaining inside the fuel cell stack 110.

Meanwhile, when the controller 170 detects the battery is fully charged during driving downhill, the controller 170 supplies and consumes the electric energy (extra energy) generated through regenerative braking to the heater 120. The controller 170 supplies coolant to the fuel cell stack 110 and the heater 120 by necessary amounts by controlling the opening degrees of the first entrance 161, the second entrance 162, and the third entrance 163 to prevent the heater 120 from being overheated.

Third, the following description will be made with reference to FIG. 3 while focusing on the flow control of the coolant in the cold start of the thermal management system or in requiring the consumption of internal residual energy and extra energy (excessive energy) of the fuel cell stack 110.

The controller 170 supplies and consumes the electric energy, which is generated by the fuel cell stack 110, to the heater 120 to induce an increase in the temperature of the fuel cell stack 110 in cold start. In this case, the controller 170 controls the flow rate of the coolant supplied to the heater 120 by controlling the opening degree of the third entrance 163 to prevent the burning of the heater 120.

In addition, the controller 170 closes the opening degree of the first entrance 161 by controlling the opening degree of the second entrance 162 to prevent the fuel cell stack 110 from being deteriorated. In other words, the controller 170 blocks the supply of the coolant having the temperature decreased by the radiator 150.

In addition, the controller 170 may control the flow rate of the coolant supplied to the ion filter 140 during the cold start by controlling the opening degree of the fifth entrance 165.

Fourth, the following description will be made with reference to FIG. 4 while focusing on the flow control of the coolant in preventing the ion filter from being exposed to the higher temperature.

When the thermal energy exceeding the limit of the heat radiation of the radiator 150 is generated from the fuel cell system, the temperature of the coolant is increased to accelerate the deterioration of the durability of the ion exchange resin in the ion filter 140. To prevent the durability of the ion exchange resin from being deteriorated, the controller 170 controls the opening degree of the fifth entrance 165 in the high temperature (highly heating) to reduce the flow rate of the coolant flowing into the ion filter 140 or closes the opening degree of the fifth entrance 165 to stop the supply of the coolant.

Figure 5:
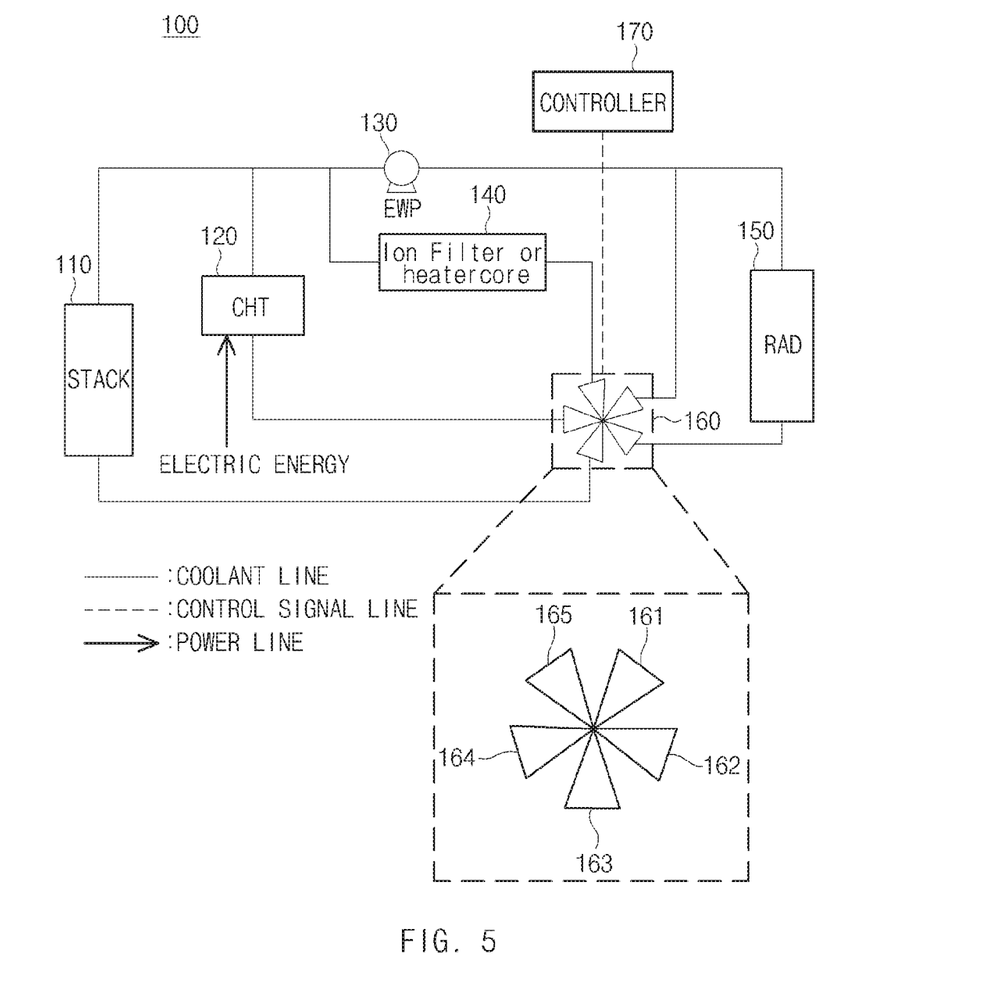
FIG. 5 is a view illustrating a thermal management system according to another embodiment of the present disclosure.

FIG. 5 is a view illustrating a thermal management system according to another embodiment of the present disclosure. The following description of the present embodiment will be made while focusing on the difference in components from the thermal management system illustrated in FIG. 1.

Referring to FIG. 5, the thermal management system 100 includes a fuel cell stack no, a heater 120, a pump 130, an ion filter 140, a radiator 150, a valve 160, and a controller 170.

The fuel cell stack 110 produces electric energy by an electrochemical reaction between hydrogen and oxygen. The electric energy generated from the fuel cell stack 110 is supplied to the electric motor (not illustrated) or the heater 120. To prevent the temperature of the fuel cell stack 110 from being increased due to heat generated in the electrochemical reaction, the coolant is flowing into the fuel cell stack 110.

The heater 120 heats the coolant to increase the temperature of the coolant. In addition, the heater 120 removes oxygen and hydrogen remaining in the fuel cell stack 110 in the vehicle shutdown or in the vehicle collision. The heater 120 receives and consumes electric energy produced through regenerative braking when the battery is fully charged during driving downhill. The heater 120 receives and consumes electric energy produced by the fuel cell stack no in the cold start. The heater 120 may heat the coolant by receiving electric energy from the battery (high voltage battery) when the coolant is heated.

The pump 130 circulates the coolant. The pump 130 may supply the coolant to the fuel cell stack 110, the heater 120, and/or the ion filter 140.

The ion filter 140 is disposed between the outlet end of the pump 130 and the valve 160. The ion filter 140 removes ions from the coolant circulated by the pump 130 to maintain the electrical conductivity of the coolant to be constant. A heater core may be positioned between the output end of the pump 130 and the valve 160, instead of the ion filter 140.

The radiator 150 decreases the temperature of the coolant through heat exchange between the coolant and the ambient air. The radiator 150 cools the coolant having the increased temperature, which is supplied from at least one of the fuel cell stack 110, the heater 120, and/or the ion filter 140.

The valve 160 is disposed between the outlet end of the fuel cell stack 110 and the inlet end of the radiator 150 to determine a flow path depending on the temperature of the coolant. The valve 160 adjusts the flow rate of the coolant flow from at least one of the outlet end of the fuel cell stack 110, the outlet end of the heater 120, and/or the outlet end of the ion filter 140.

The valve 160 may be implemented as a five way valve (five-way valve). In other words, the five-way valve includes the first entrance 161 connected with the inlet end of the pump 130, the second entrance 162 connected with the inlet end of the radiator 150, the third entrance 163 connected with the outlet end of the fuel cell stack 110, the fourth entrance 164 connected with the exit end of the heater 120, and the fifth entrance 165 connected with the exit end of the ion filter 140.

The controller 170 controls the temperature and the flow of the coolant, which is supplied to the fuel cell stack 110, by controlling opening or closing and/or the opening degree of the valve 160 depending on the operation mode of the thermal management system 100. The controller 170 may determine an operation mode of the thermal management system 100 based on data collected through sensors mounted on a vehicle and/or an electronic control unit (ECU).

Hereinafter, the operation of the controller 170 will be described in more detail with reference to FIGS. 6 to 8.

Figure 6:
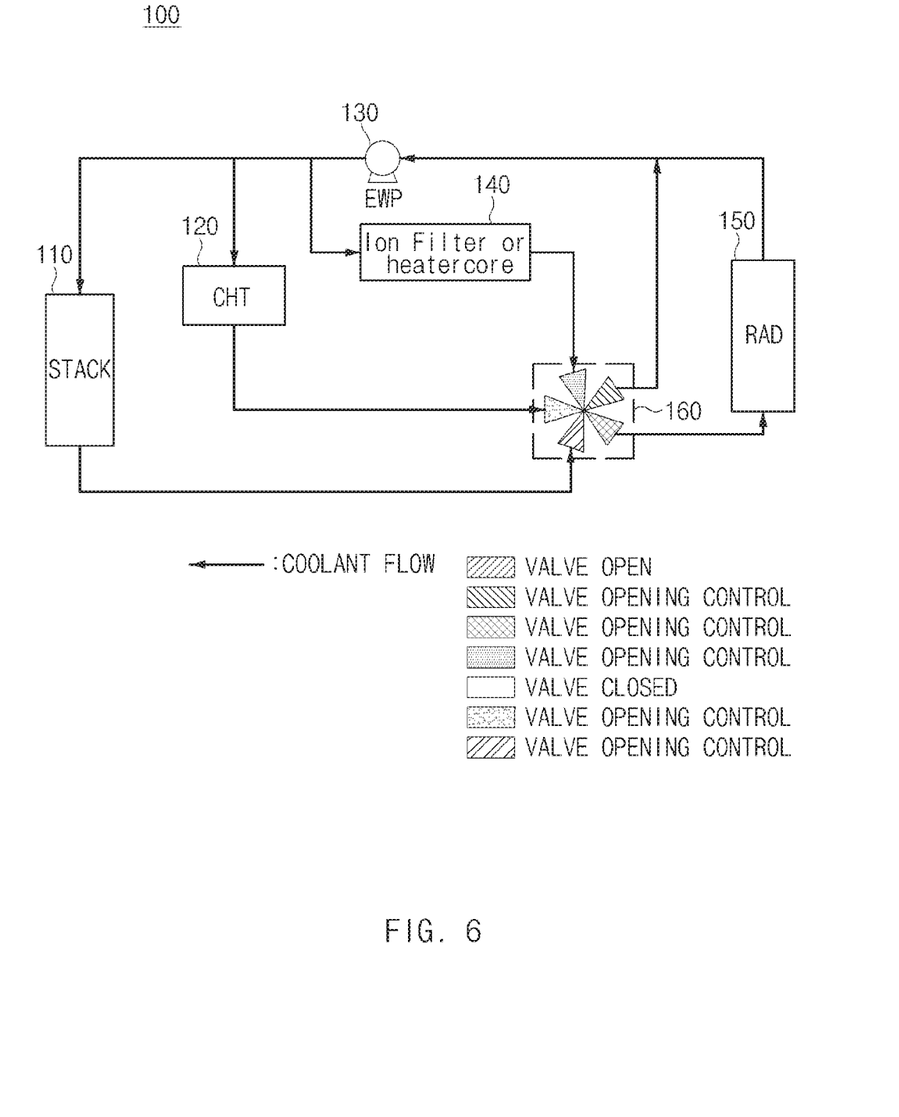
FIGS. 6 to 8 are views illustrating the flow of a coolant depending on valve control of the thermal management system according to another embodiment of the present disclosure.
Figure 7:
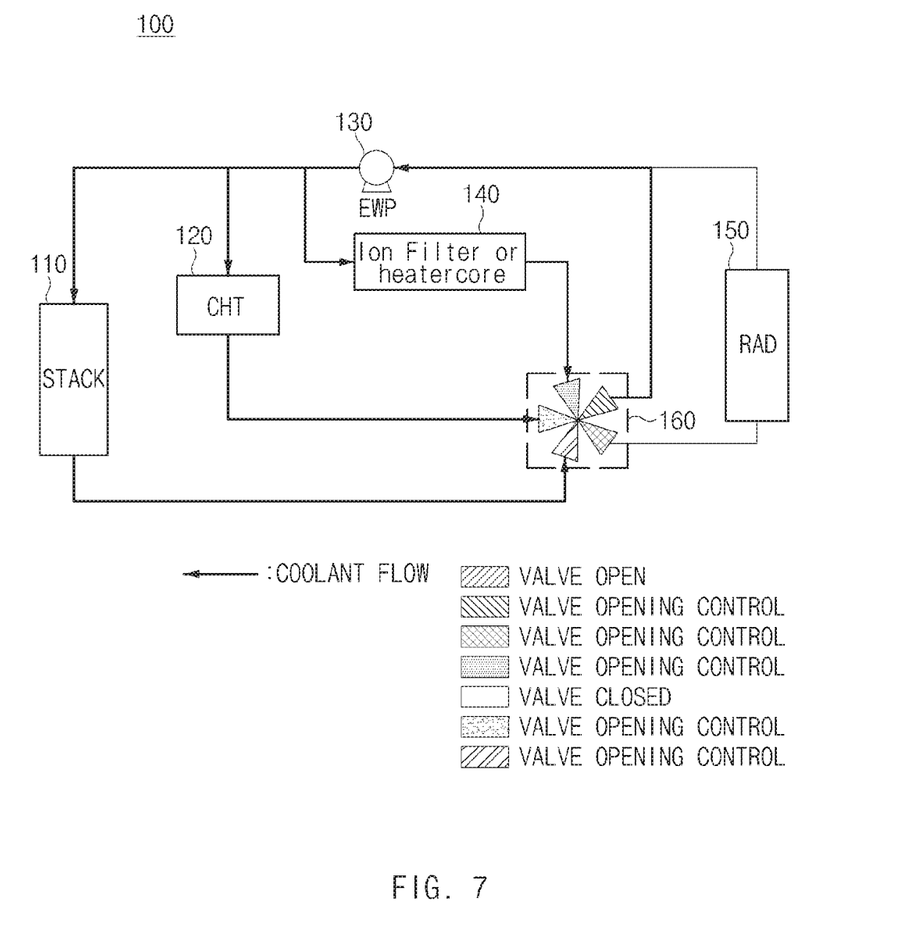
Figure 8:
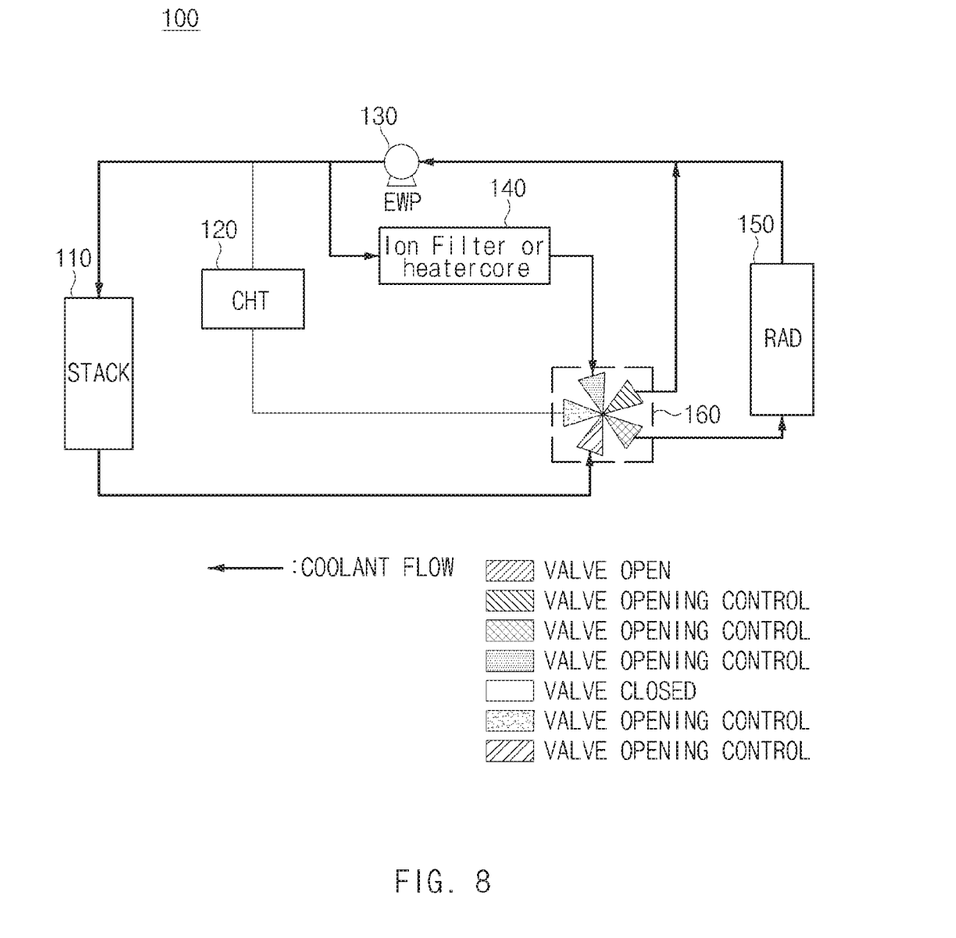

FIGS. 6 to 8 are views illustrating the flow of a coolant depending on valve control of the thermal management system according to another embodiment of the present disclosure.

First, the following description will be made with reference to FIG. 6 while focusing on the flow control of the coolant when the temperature of the fuel cell stack 110 is controlled.

When the temperature (system temperature) of the fuel cell stack 110 is out of the operating temperature range, the controller 170 senses the temperature out of the operating temperature range through the fuel cell management device (not illustrated), and controls the opening amounts (open degrees) of the first entrance 161 and the second entrance 162 of the valve 160 to maintain the temperature of the fuel cell stack 110 to a target temperature. In this case, the opening amount of the first entrance 161 may be set to 'x', and the opening amount of the second entrance 162 may be set to '1−x'.

When the temperature of the coolant is higher than the target temperature, the controller 170 increases the opening amount of the second entrance 162 (that is, decreases the opening amount of the first entrance 161) to increase the flow rate of the coolant supplied to the radiator 150. Meanwhile, when the temperature of the coolant is lower than the target temperature, the controller 170 increases the opening amount of the first entrance 161 (decreases the opening amount of the second entrance 162) to increase the flow rate of the coolant to be bypassed from the fuel cell stack 110 and supplied to the pump 130. Accordingly, the controller 170 may maintain the temperature of the coolant to the target temperature.

The controller 170 controls the opening degree (opening amount) of the fifth entrance 165 to control the flow rate of the coolant passing through the ion filter 140.

The controller 170 may selectively control the opening degree of the fourth entrance 164 to adjust the flow rate of the coolant, which is heated by the heater 120, to the pump 130. The controller 170 may control the third entrance 163 and the fourth entrance 164 to selectively control the flow rates of the fuel cell stack 110 and the heater 120.

For example, when the cooling of the coolant is required, the controller 170 closes the fourth entrance 164 to block the supply of the coolant heated by the heater 120. When the increase in the temperature of the coolant is required, the controller 170 supplies power to the heater 120 to induce the increase in the temperature of the coolant, and controls the opening degrees of the third entrance 163 and the fourth entrance 164 such that the coolant is supplied to the fuel cell stack 110 and the heater 120 at the flow rate required by the thermal management system 100.

Second, the following description will be made with reference to FIG. 6 while focusing on the flow control of the coolant when the consumption of the internal residual energy and extra energy (excessive energy) of the fuel cell stack 110 is required.

The controller 170 may forcibly operate the heater 120 to consume the internal residual energy of the fuel cell stack 110 when sensing the start off of the vehicle, that is, the vehicle shutdown or the vehicle collision.

Meanwhile, when the controller 170 senses the battery is fully charged during driving downhill, the controller 170 supplies and consumes the electric energy (extra energy)

generated through regenerative braking to the heater 120. The controller 170 supplies coolant to the fuel cell stack 110 and the heater 120 by necessary amounts by controlling the opening degrees of the first entrance 161 to the fourth entrance 164 to prevent the heater 120 from being overheated.

Third, the flow control of the coolant during cold start of the thermal management system will be described with reference to FIG. 7.

The controller 170 closes the opening degree of the second entrance 162 in the cold start to block the coolant supplied to the radiator 150. The controller 170 controls the flow rate of the coolant supplied to the fuel cell stack 110 and the heater 120 by controlling the opening degrees of the third entrance 163 and the fourth entrance 164.

In addition, the controller 170 may control the flow rate of the coolant supplied to the ion filter 140 during the cold start by controlling the opening degree of the fifth entrance 165.

Fourth, the following description will be made with reference to FIG. 8 while focusing on the flow control of the coolant in preventing the ion filter from being exposed to the higher temperature.

When the thermal energy exceeding the limit of the heat radiation of the radiator 150 is generated from the fuel cell system, the temperature of the coolant is increased to accelerate the deterioration of the durability of the ion exchange resin in the ion filter 140. To prevent the durability of the ion exchange resin from being deteriorated, when the high-temperature thermal energy is generated, the controller 170 controls the opening degree of the fifth entrance 165 to reduce the flow rate of the coolant flowing into the ion filter 140 or closes the opening degree of the fifth entrance 165 to stop the supply of the coolant. Accordingly, the opening degree of the fourth entrance 164 is maintained closed, and the opening degree of the third entrance 163 is maintained open.

According to embodiments of the present disclosure, since the temperature and the flow of the coolant are controlled using one multi-valve, the cost may be saved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A thermal management system for a fuel cell vehicle, the thermal management system comprising:
    a fuel cell stack;
    a heater configured to use power generated by the fuel cell stack;
    a radiator configured to cool a coolant;
    a pump configured to circulate the coolant;
    a five-way valve configured to control a temperature of the coolant by adjusting a flow rate of the coolant supplied to the pump from at least one of the fuel cell stack, the heater, or the radiator; and
    a controller configured to control an opening degree of each entrance of the five-way valve.

2. The thermal management system of claim 1, wherein the five-way valve is disposed between the radiator and the pump.

3. The thermal management system of claim 1, wherein the controller is mounted inside the five-way valve.

4. The thermal management system of claim 1, wherein the controller is configured to adjust the temperature of the coolant by selectively controlling an opening degree of a first entrance of the five-way valve connected with an outlet end of the radiator and an opening degree of a second entrance of the five-way valve connected with an outlet end of the fuel cell stack.

5. The thermal management system of claim 1, wherein the controller is configured to:
    consume electric energy generated through regenerative braking when a battery is fully charged by supplying the electric energy to the heater; and
    adjust a flow rate of the coolant passing through the heater by adjusting an opening degree of a third entrance of the five-way valve connected with the heater.

6. The thermal management system of claim 1, wherein the controller is configured to control a flow rate of the coolant, which is supplied to the fuel cell stack and the heater, by controlling an opening degree of a second entrance of the five-way valve connected with an outlet end of the fuel cell stack and closing an opening degree of a first entrance of the five-way valve connected with an outlet end of the radiator in a cold start.

7. The thermal management system of claim 1, wherein the controller is configured to decrease or block the coolant flowing into an ion filter by controlling an opening degree of a fifth entrance of the five-way valve connected with the ion filter when thermal energy generated from the fuel cell stack exceeds a heat radiation limit of the radiator.

8. The thermal management system of claim 1, further comprising an ion filter disposed between an outlet end of the pump and the five-way valve, the ion filter configured to remove ions from the coolant.

9. The thermal management system of claim 1, further comprising a heater disposed between an outlet end of the pump and the five-way valve, the heater configured to adjust an internal temperature of a vehicle using thermal energy of the coolant.

10. The thermal management system of claim 1, wherein the five-way valve is disposed between the fuel cell stack and the radiator.

11. The thermal management system of claim 10, wherein the controller is configured to adjust the temperature of the coolant by selectively controlling an opening degree of a first entrance of the five-way valve connected with an inlet end of the pump and an opening degree of a second entrance of the five-way valve connected with an outlet end of the radiator.

12. The thermal management system of claim 10, wherein the controller is configured to:
    consume electric energy generated through regenerative braking when a battery is fully charged by supplying the electric energy to the heater; and
    adjust a flow rate of the coolant passing through the heater by adjusting an opening degree of a fourth entrance of the five-way valve connected with the heater.

13. The thermal management system of claim 10, wherein the controller is configured to:
    control a flow rate of the coolant, which is supplied to the fuel cell stack and the heater, by closing an opening degree of a second entrance of the five-way valve connected with an inlet end of the radiator and controlling an opening degree of a third entrance of the five-way valve connected with an outlet end of the fuel cell stack and an opening degree of a fourth entrance of the five-way valve connected with an outlet end of the heater in a cold start.

14. The thermal management system of claim 10, wherein the controller is configured to decrease or block the coolant flowing into an ion filter by controlling an opening degree of a fifth entrance of the five-way valve connected with the ion filter when thermal energy generated from the fuel cell stack exceeds a heat radiation limit of the radiator.

15. A thermal management system for a fuel cell vehicle, the thermal management system comprising:
   a valve;
   a radiator having an outlet end connected to a first entrance of the valve;
   a fuel cell stack having an outlet end connected to a second entrance of the valve;
   a heater having an outlet end connected to a third entrance of the valve;
   a pump having an inlet end connected with a fourth entrance of the valve; and
   an ion filter having an outlet end connected with a fifth entrance of the valve.

16. The thermal management system of claim 15, further comprising a controller configured to control an opening degree of each entrance of the valve.

17. A thermal management system for a fuel cell vehicle, the thermal management system comprising:
   a valve;
   a pump having an inlet end connected with a first entrance of the valve;
   a radiator having an inlet end connected to a second entrance of the valve;
   a fuel cell stack having an outlet end connected to a third entrance of the valve;
   a heater having an exit end connected to a fourth entrance of the valve;
   an ion filter having an exit end connected with a fifth entrance of the valve; and
   a controller configured to control an opening degree of each entrance of the valve.

* * * * *